United States Patent [19]

Abbott, III

[11] 4,035,013
[45] July 12, 1977

[54] DRAG REDUCER FOR LAND VEHICLES

[75] Inventor: C. Webster Abbott, III, Bethany, Conn.

[73] Assignee: Rudkin-Wiley Corporation, Stratford, Conn.

[21] Appl. No.: 640,225

[22] Filed: Dec. 12, 1975

[51] Int. Cl.² .................................. B62D 35/00
[52] U.S. Cl. ........................... 296/1 S; 105/2 R
[58] Field of Search .............. 296/1 S; 105/2 R; 160/290

[56] References Cited

U.S. PATENT DOCUMENTS

| | | | |
|---|---|---|---|
| 1,109,744 | 9/1914 | Emery | 160/290 R |
| 1,119,499 | 12/1914 | Donaldson | 160/290 R |
| 3,834,752 | 9/1974 | Cook | 105/2 R |
| 3,951,445 | 4/1976 | Tatom | 296/1 S |

Primary Examiner—Philip Goodman
Attorney, Agent, or Firm—Mattern, Ware, Davis and Stoltz

[57] ABSTRACT

A drag reducer for a gap in a land vehicle moving through air which consists of a retractable or articulated baffle, spanning approximately the entire distance of the gap. The drag reducer can be used on all land vehicles and is readily adaptable for use on railroad box cars, truck semitrailers, full trailers in tandem and vehicles towed by cars. The drag reducer can take the form of a fin mounted rigidly or with articulated joint or flexible material to allow for movement between the leading and trailing vehicles. It may also be of a retractable nature, such as an accordian arrangement, a roll-up screen, an inflatable fin, a folding plate, etc. The unit may be attached primarily to either the lead vehicle or trailing vehicle or both, however, in the case of tractor-trailer trucks, the bulk of the device is better kept with the tractor unit, because there are approximately one-third the number of tractors compared to trailers, resulting in substantial savings in the cost of equipping fleets of tractor-trailer rigs.

2 Claims, 11 Drawing Figures

DRAG REDUCER FOR LAND VEHICLES

SUMMARY OF THE INVENTION

This invention relates to practical means for substantially closing off the entire gap area between the tractor and trailer of a semi-trailer of a semi-trailer or full trailer rig. Similar means may also be utilized in car-trailer combinations and railroad box cars.

The basic concepts and reasons for sealing this gap are taught in the W. S. Saunders U.S. Pat. No. 3,697,120. This patent points out that when a tandem type vehicle of conventional design encounters wind forces at yaw angles, the flow of air can pass laterally through the gap region, resulting in increased aerodynamic drag. This is caused by a flow separation and increased turbulence along the lee side of the following body. The effect is increased when the corners of the trailing body are sharp, chamfered or moderately radiused as in the case of present day vehicles.

The concept of stabilizing the normal rotating vortex system in the gap region is well documented in the above reference patent and as, the patent teaches, the ideal situation would be to completely close the gap by a stabilizer plate. However, the patent points out that due the practicalities of maneuvering a tractor-trailer combination, it is only feasible to partially close the gap. For this reason, the full gap-sealer is illustrated only on non-articulated, or rigid chassis trucks. A substantially complete gap sealer is illustrated for two trailing vehicles such as railroad box cars. This approach can also be utilized in the case of trucks rigged to haul one semi-trailer plus one or more full trailers, however the geometry and pivot points in these types of trailers are such that an interferance can come about unless the gap size is increased.

Previous means for substantially sealing the gap in semi-trailer trucks have consisted of rigid fins attached to the front face of the trailer. These fins have been dimensioned so as to fill as much of the gap as possible, consistant with the turning and pitching attitudes of tractor-trailer rigs in normal operation.

If one assumes an ideal operation consisting of a matched tractor and trailer which always run together as a set, and further assumes an almost perfectly flat roadbed, then the trailer mounted fin could, in fact, extend almost the entire distance from the front of the trailer, to the back of the tractor, without encountering an interference. This is true because the pivot point of a typical tractor and semi-trailor rig is located under the trailer and therefore in any turning maneuver on level ground, the tractor falls away from the leading vertical edge of the trailer-mounted fin. Further, there would be no pitching effect such as the tractor climbing a curb or inclined ramp while the trailer is still on level ground. This condition causes the gap to close at the top and could cause an interference at the top of the cab.

In actual trucking conditions, however, a rigid full gap vortex stabilizer is not practical because of the occasional pitching between tractor and trailer. Also the distance between the rear of the tractor and the front of the trailer is occasionally altered by the trucker, utilizing a sliding fifth-wheel. Therefore a rigid, trailer mounted vortex stabilizer might work properly when sized for a 60 inch gap, but would constitute an interference if the gap were closed by sliding the fifth-wheel assembly foward, by say, 12 inches.

This invention then relates to practical means for closing the gap between tractor units and trailer or trailing units. In the preferred embodiment, for tractor and semi-trailer rigs the gap sealing baffle is better attached to the rear of the tractor than the front of the trailer for economic reasons there being roughly one tractor, for every three trailers in general use and this ratio has consistently increased over the years.

A further feature of this invention is that the baffle is made to collapse, deflate, roll-up or otherwise deflect so as to eliminate or minimize the effect of the interference condition which would normally exist when the truck turned or pitched or did both simultaneously.

OBJECTS OF THE INVENTION

Therefore an object of the invention is to provide a practical air resistance reducing apparatus in the form of a baffle or plate that is capable of substantially filling the gap between the vehicles.

Another object is to provide means for retracting said baffle or causing it to move out of the way when an interference condition exists.

A further object is to secure the unit to the tractor rather than the trailer in order to reduce total fleet costs.

Another object is to provide a transparent membrane so that driver visibility will not be reduced when backing the vehicle.

THE DRAWINGS

For a fuller understanding of the nature and objects of the invention, reference should be had to the following detailed description taken in connection with the accompanying drawings, in which.

SPECIFIC DESCRIPTION

Figure 1:
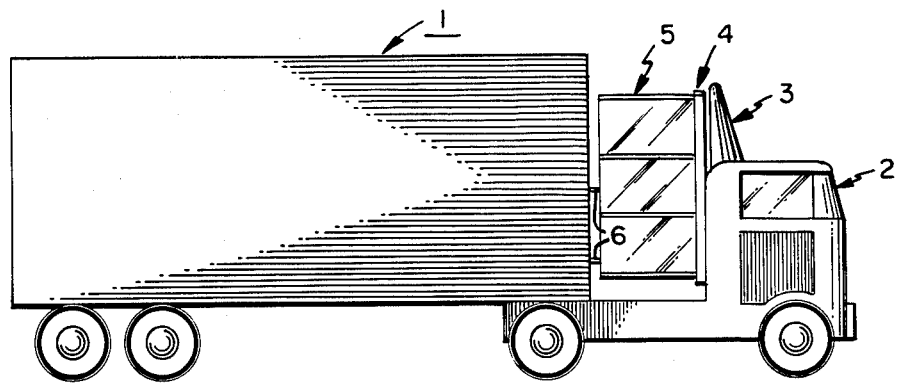
FIG. 1 is a side view of a standard tractor and semi-trailer with the apparatus according to the invention mounted in place.

Referring to the drawings, FIG. 1 illustrates a typical tractor-trailer rig in which a gap exists between tractor 2 and semi-trailer 1. In practice this gap may range anywhere from approximately 20 to 100 inches depending upon various fleet and motor vehicle regulation requirements. The tractor in this case is fitted with a typical wind deflector 3, mounted at the rear of the roof, however the wind deflector 3 need not be present in order to obtain aerodynamic drag reduction advantages from the gap sealer. The gap sealer 5, is attached to a housing 4, which is in turn attached to tractor 2. The gap sealer and its housing comprise the bulk of the equipment, with only eye bolts or similar attachment hardware required for the front of the trailer. Snap-shackles/pintels or similar hooking hardware are attached to the trailing edge of the gap-sealer and engage the aforementioned eyebolts at attachment points 6.

Figure 2:
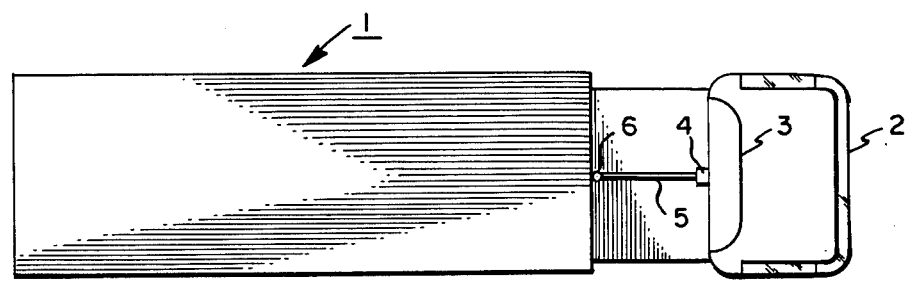
FIG. 2 is a top view of the tractor and semi-trailer of FIG. 1.

FIG. 2, illustrates the same equipment from a top view and item members correspond.

Figure 3:
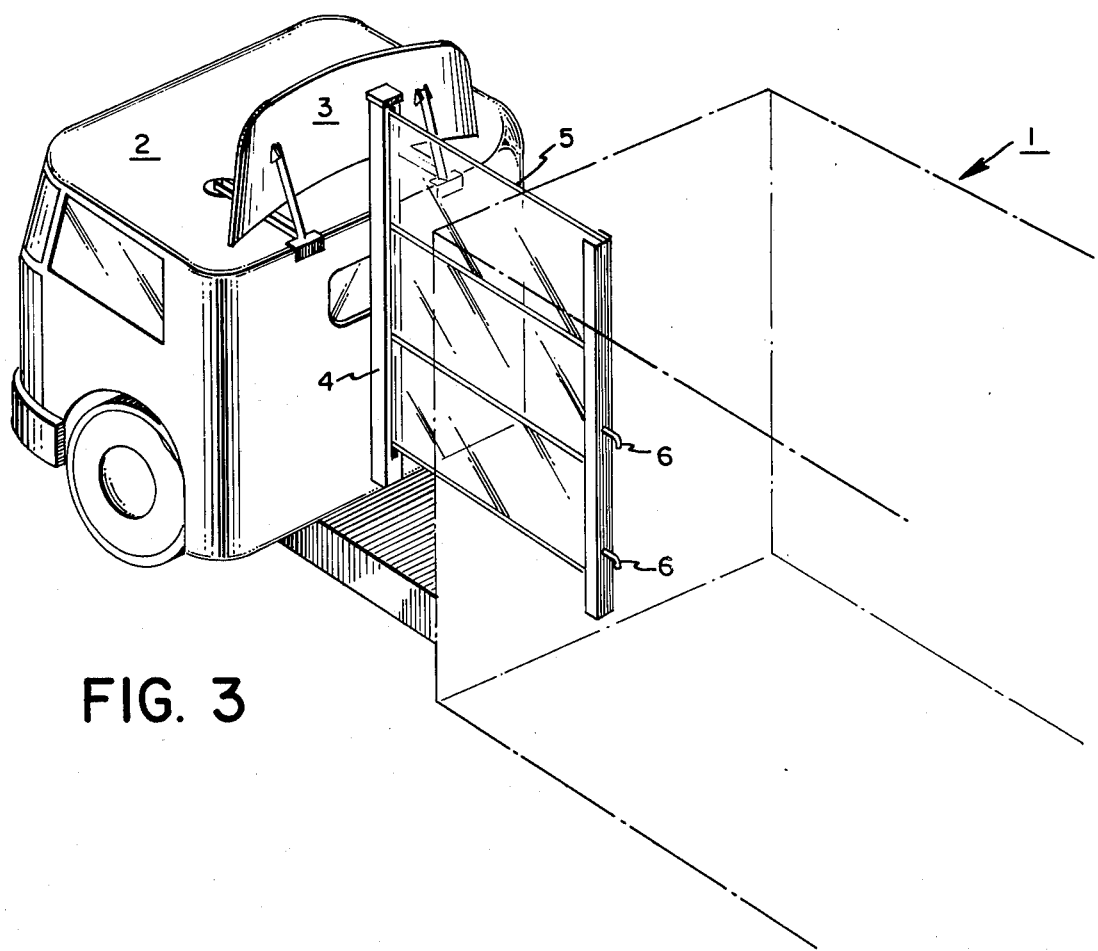
FIG. 3 is a perspective view of a gap-filler baffle mounted in place on a tractor-trailer equipped with a wind-deflector. This unit may be extended or retracted by means of a roller.

FIG. 3, shows one form of the apparatus wherein the gap-sealer 5 is a flexible membrane. In this case the membrane is transparent however it may be opaque, as well. The membrane is attached to a spring-loaded roller which is located within housing 4. The membrane is therefore under constant tension. When the tractor 2 turns in relation to trailer 1, the effective distance from housing 4 to fastening points 6 is increased. Extra membrane material stored on the roller, is pulled out from the housing 4 and at the same tinme kept in tension. As the tractor trailer resumes a straight ahead attitude, the membrane material is retracted back into its housing by spring tension.

Also, when no trailer is attached to the tractor, the entire membrane 5, is retracted into the housing for convenient storage while the tractor is either parked or moving. When the tractor and trailer are pitched in relation to one another, the flexible membrane is capable of buckling at the top, while the lower edge is self-adjusting.

In some instances the tractor may turn to an attitude in excess of 90° in relation to the center line of the trailer. In these cases, the flexible membrane bends around the corner of the trailer. Horizontal reinforcing strips are adhered to the membrane to resist excessive abrasion under these conditions.

Quick disconnect means 6 are provided at the trailing edge of the membrane.

Figure 4:
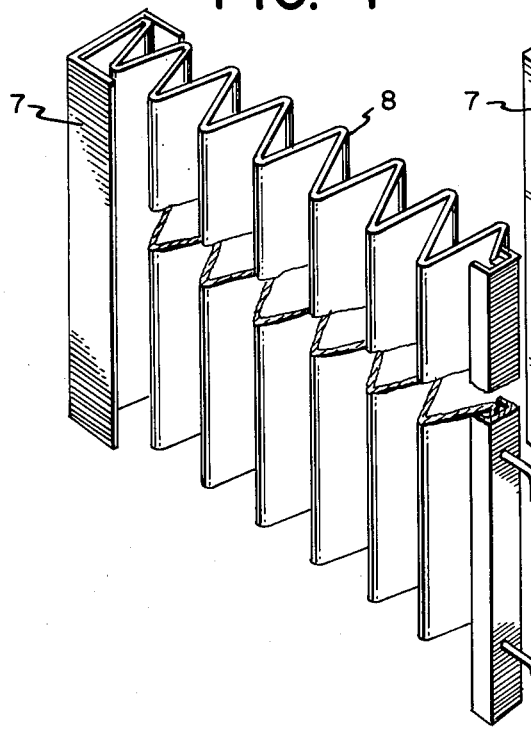
FIG. 4 is a perspective of a baffle unit similar to FIG. 3, but in the form of an accordian pleat.

FIG. 4 illustrates a similar type of gap sealer wherein housing 7 is opened to the rear and accordian pleated material such as fabric reinforced flexible sheeting is provided. Internal splines and/or pre-formed or pre-molded accordian pleats in the closed position provide vertical stiffness. Telescoping or sissor type restraining apparatus such as shown in 10 of FIG. 5 may be provided.

Figure 5:
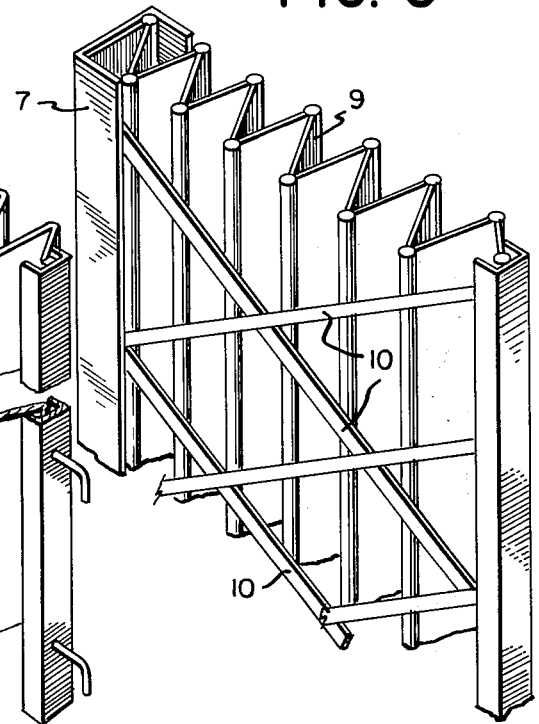
FIG. 5 is a perspective of a baffle unit similar to FIG. 3, but in the form of a hinged, folded-plate with sissor-type extension apparatus.

FIG. 5, shows a hinged, folded-plate design, consisting of housing 7, folded plates 9 and sissor apparatus 10. This unit can be manually disengaged and placed in the retracted position when the tractor-trailer rig is maneuvering in tight turning situations such as city traffic and pick up and delivery. During these periods, the truck is operating at very low speeds when aerodynamic drag reduction is not a consideration.

Figure 6:
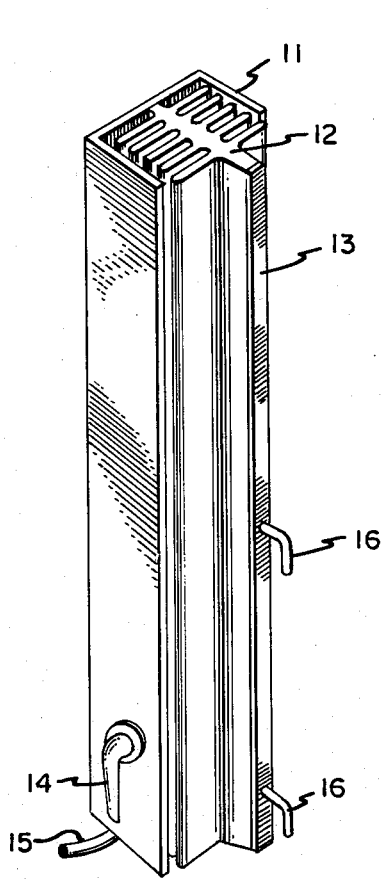
FIG. 6 is a perspective of a baffle unit similar to FIG. 3, but in the form of an extendible flexible bellows in its contracted form.
Figure 7:
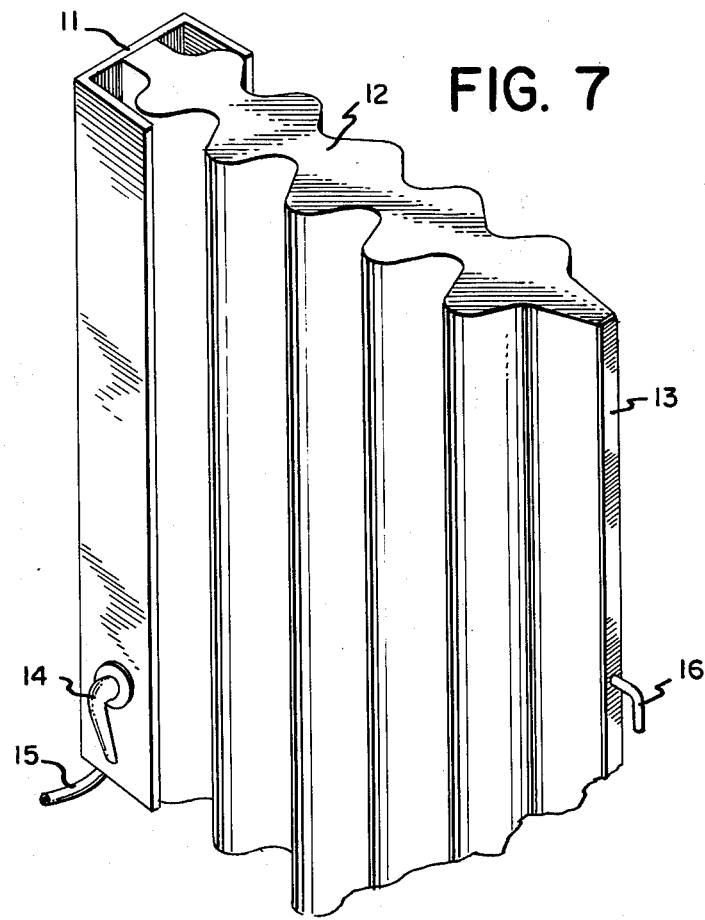
FIG. 7 is the same unit as FIG. 6, in its extended form.

FIG. 6 and FIG. 7 illustrate respectively the retracted and extended modes of an inflatable gap-filler. Open housing 11, contains the retracted bellows 12, and trailing rigid edge membranes 13. Fastening means 16 are provided for attachment to the trailer, however it would also be possible to dispense with the fastening means 16, if the bladder were constructed to become semi-rigid during the inflated mode. Compressed air from the tractors' normal air supply is fed to the unit via pressure hose 15 through valve 14.

Figure 8:
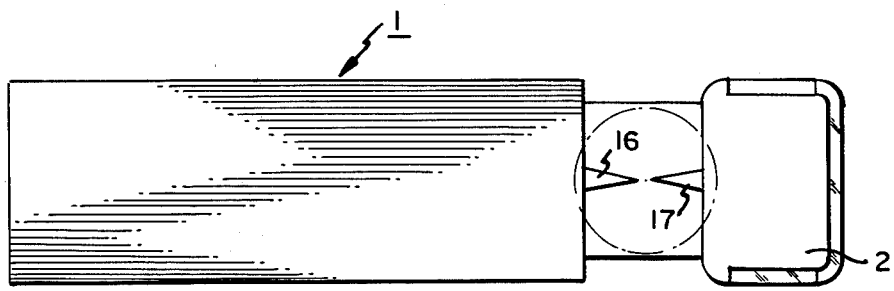
FIGS. 8 and 8a represent a form of rigid vortex stabilizers which are closed by means of a flexible fin.
Figure 8A:
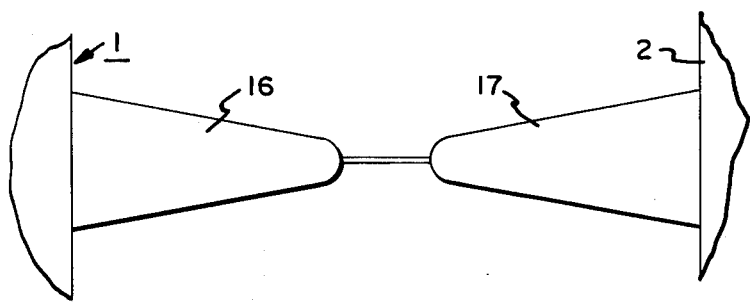

FIG. 8 and Detail 8a, illustrate a rigid vortex stabilizer attached to both front of trailer 16 and back of cab 17 with a flexible membrane attached to one unit or the other. The flexible membrane wipes past the nose section of the opposing vortex stabilizer in a turning situation. During normal straight ahead operation, the flexible membrane effectively seals the gap.

Figure 9:
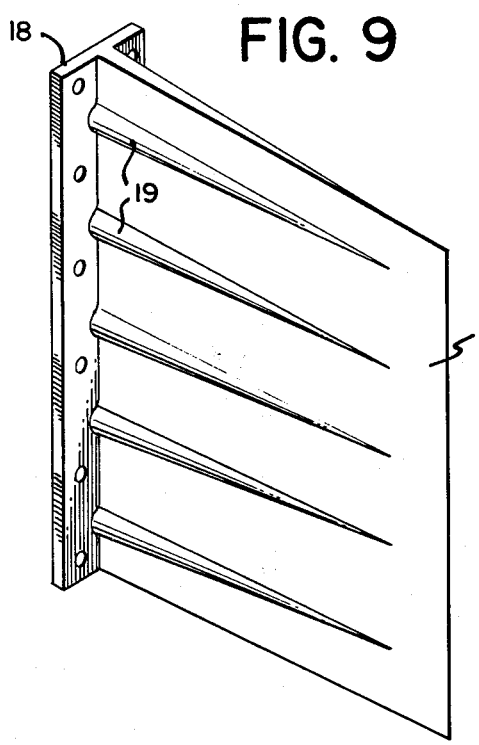
FIG. 9 is a perspective of a solid baffle having a continually varying section of a semi-rigid material.

FIG. 9 shows a gap filling vortex stabilizer 20 for mounting to the rear of the tractor or the front of the trailer. A rubber or plastic compound such as polyethylene may be used. The heavier section near the mounting flange 18, is relatively stiff because of its thickness, while the thin section at the opposite edge is very flexible and therefore capable of bending during an interference mode. Supplementory ribs or corrugations 19, may be introduced to produce the required variable flexibility.

Figure 10:
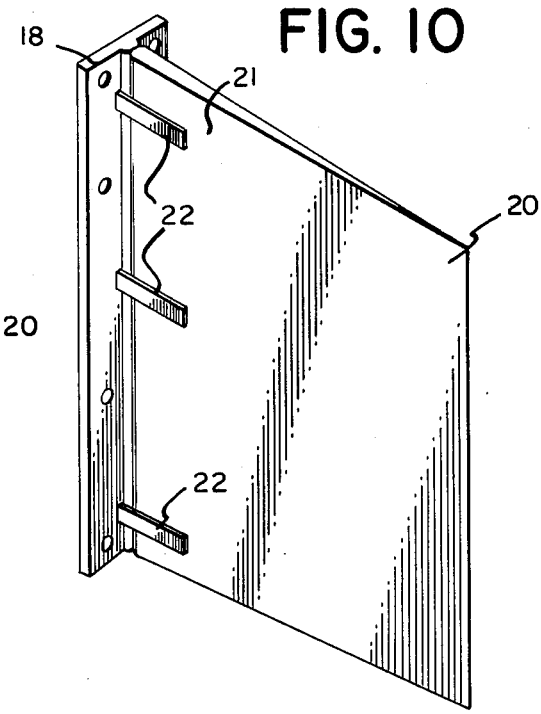
FIG. 10 is a perspective of a solid baffle having center seeking hinges capable of 90° hinged movement.

FIG. 10 illustrates a semi-rigid vortex stabilizer 21 gap sealer of the same character as the unit shown in FIG. 9, except that the unit is hinged vertically at hinge points 22. The hinges are of a type that seek normally centered position under spring or cam tension with a breakaway force sufficient to resist side wind loading but insufficient to resist mechanical interference between the tractor and trailer. Edge 20 is relatively thin and flexible to allow for bending when the rig is in a pitched condition.

It will thus be seen that the objects set forth above, among those made apparent from the preceding description, are efficiently attained and, since certain changes may be made in the above product without departing from the scope of the invention, it is intended that all matter contained in the above description (or shown in the accompanying drawings) shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure Letters Patent is:

1. A drag reducer for mounting in the gap of a land vehicle wherein said gap is established by two substantially vertical surfaces defined by a rear panel of a leading element and a leading panel of a trailing element, and for partially stabilizing at least one vortex, the periphery of which is defined and confined by said drag reducer, a portion of said two surfaces and the slip stream along one of the open sides of the gap, said drag reducer comprising:

A. a mounting bracket for securement
B. roller means mounted within said bracket under tension;
C. a flexible sheet member mounted along one vertical edge to said roller mans with additional flexible sheet material mounted about said roller means then required to fill the gap; and
D. disconnectable attachment means mounted along the other material edge of said sheet material and removably attachable to the other of said surfaces;

whereby the drag reducing flexible member can be withdrawn from the mounting bracket on the first surface secured to the second surface, and maintained in this position by said tensioned roller means, thereby substantially completely filling the gap between said two surfaces while assuring that said sheet member remains completely unaffected by the pivoting, articulating, and independent movement of said two elements.

2. A drag reducer for mounting in the gap of a land vehicle wherein said gap is established by two substantially vertical surfaces defined by a rear panel of a leading element and a leading panel of a trailing element, and for stabilizing at least one vortex, the periphery of which is defined and confined by said drag reducer, a portion of said two surfaces and the slip stream along one of the open sides of the gap, said drag reducer comprising:
- A. a mounting bracket for securement to one of said surfaces;
- B. roller means mounted within said bracket under tension;
- C. a flexible sheet member a) mounted along one vertical edge to said roller means with additional flexible sheet material mounted about said roller means then required to fill the gap; and b) incorporating reinforcing material at a plurality of locations along its length; and
- D. disconnectable statement means mounted along the other vertical edge of said sheet material and removably attachable to the other of said surfaces;

whereby the drag reducing flexible member can be be withdrawn from the mounting bracket on the first surface secured to the second surface, and maintained in this position by said tensioned roller means, thereby substantially completely filling the gap between said two surfaces while providing reinforcing material to prevent wear from contact with the panels of the elements.

* * * * *

UNITED STATES PATENT AND TRADEMARK OFFICE
CERTIFICATE OF CORRECTION

PATENT NO. : 4,035,013
DATED : July 12, 1977
INVENTOR(S) : C. Webster Abbott III It is certified that error appears in the above-identified patent and that said Letters Patent are hereby corrected as shown below:

Page 1 of 2

```
Col. 1, Line  8, omit second occurrence of "of a semi-trailer"
Col. 1, Line 35, "interferance" should be --interference--
Col. 1, Line 41, "consistant" should be --consistent--
Col. 1, Line 43, "operation" should be --condition--
Col. 1, Line 50, "semi-trailor" should be --semi-trailer--
Col. 1, Line 61, "occassional" should be --occasional--
Col. 1, Line 63, "occassional" should be --occasional--
Col. 1, Line 68, "foward" should be --forward--
Col. 2, Line 47, "sissor-type" should be --scissor-type--
Col. 2, Line 50, "extendible" should be --extendable--
Col. 3, Line 12, "members" should be --numbers--
Col. 3, Line 22, "tinme" should be --time--
Col. 3, Line 46, "sissor" should be --scissor--
Col. 3, Line 50, "sissor" should be --scissor--
Col. 3, Line 60, "membranes" should be --membrane--
Col. 4, Line 13, "Supplementory" should be --Supplementary--
Col. 4, Line 19, insert --a-- before "normally"
Col. 4, Line 40, insert --by-- before "Letters"
```

UNITED STATES PATENT AND TRADEMARK OFFICE
CERTIFICATE OF CORRECTION

PATENT NO. : 4,035,013
DATED : July 12, 1977
INVENTOR(S) : C. Webster Abbott III It is certified that error appears in the above-identified patent and that said Letters Patent are hereby corrected as shown below:

Col. 4, Line 50, insert --to one of said surfaces;-- after "securement"
Col. 4, Line 54, "mans" should be --means--
Col. 6, Line 4, "statement" should be --attachment--

Signed and Sealed this

Seventeenth Day of January 1978

[SEAL]

Attest:

RUTH C. MASON
Attesting Officer

LUTRELLE F. PARKER
Acting Commissioner of Patents and Trademarks